United States Patent [19]

Iwasaki et al.

[11] Patent Number: 4,720,753
[45] Date of Patent: Jan. 19, 1988

[54] AUTO TRACKING APPARATUS FOR SCANNING TRACKS WITH CONTROLLABLE HEAD DISPLACEMENT

[75] Inventors: Yasuo Iwasaki; Takafumi Nishino, both of Osaka; Masaaki Kobayashi, Kawanishi, all of Japan

[73] Assignee: Matsushita Electric Industrial Co., Ltd., Japan

[21] Appl. No.: 829,630

[22] Filed: Feb. 5, 1986

[30] Foreign Application Priority Data

Feb. 8, 1985 [JP] Japan .................................. 60-23885

[51] Int. Cl.⁴ ....................... G11B 5/588; G11B 21/10
[52] U.S. Cl. ...................................................... 360/77
[58] Field of Search .............................. 360/10.1–10.3, 360/70, 75, 77, DIG. 1

[56] References Cited

U.S. PATENT DOCUMENTS 4,433,350  2/1984  Tsuruta ................................. 360/70
4,451,860  5/1984  Honjo et al. ......................... 360/77
4,486,796 12/1984  Sakamoto ............................ 360/77
4,520,410  5/1985  Sekiguchi et al. ................... 360/77

Primary Examiner—Raymond F. Cardillo
Assistant Examiner—Steven R. Garland
Attorney, Agent, or Firm—Lowe, Price, LeBlanc, Becker & Shur

[57] ABSTRACT

An auto tracking apparatus is arranged to divide a tracing time period of one field of a frame into a plurality of time domains and to sample and hold the envelope detection output signal of a reproduced high frequency signal at every time domain. This sample-and-hold operation is successively made for the following frame and each of the sampled values is compared with the previously value sampled at the corresponding time domain. In accordance with the results of the comparison the displacement of the reproducing head is controlled at every sampling point so that a reproducing head can accurately scan the track along the center line thereof.

2 Claims, 18 Drawing Figures

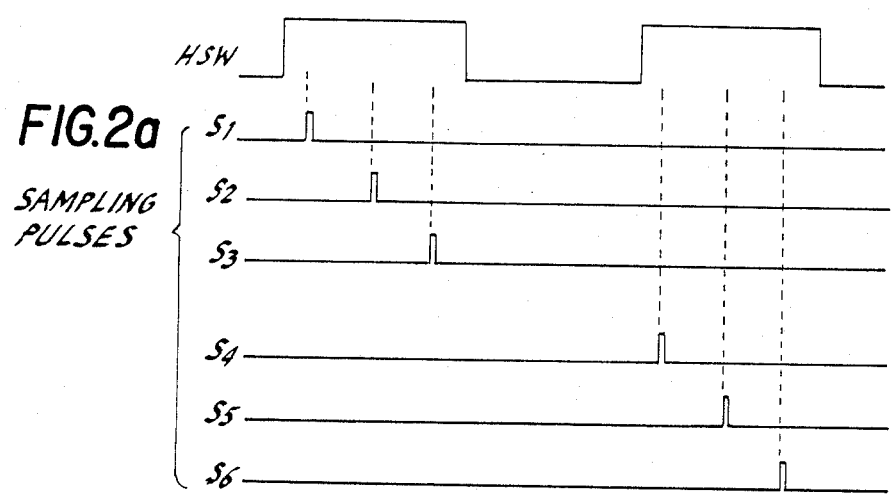
FIG.2a SAMPLING PULSES
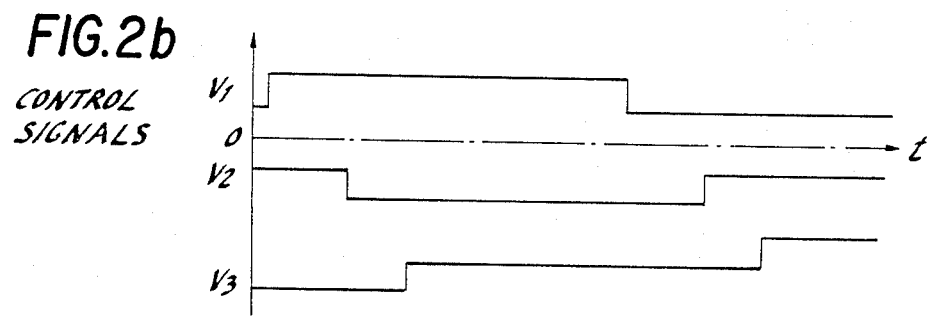
FIG.2b CONTROL SIGNALS
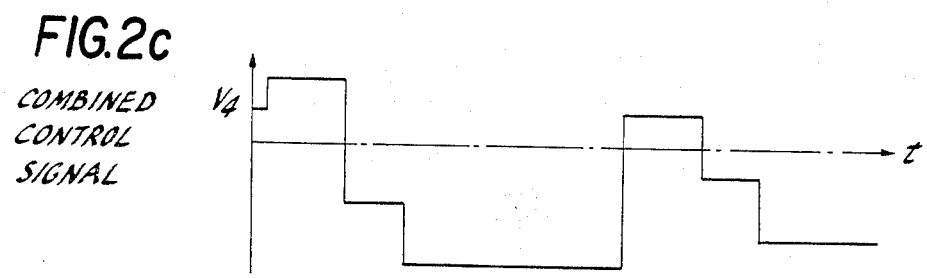
FIG.2c COMBINED CONTROL SIGNAL

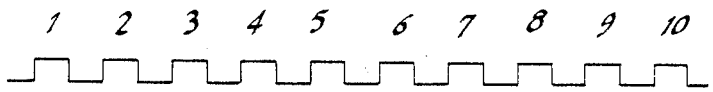
FIG.8a PRIOR ART HSW
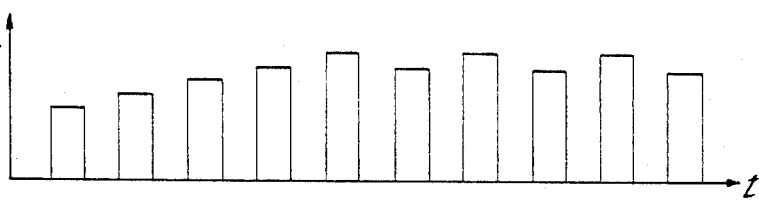
FIG.8b PRIOR ART ENVELOPE LEVEL
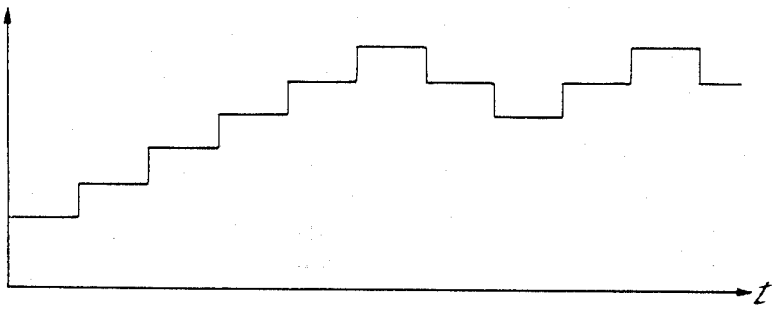
FIG.8c PRIOR ART APPLIED VOLTAGE (a)

(b)

AUTO TRACKING APPARATUS FOR SCANNING TRACKS WITH CONTROLLABLE HEAD DISPLACEMENT

BACKGROUND OF THE INVENTION

The present invention relates to an auto tracking apparatus for use in video tape recorders of the helical scan type having a pair of rotary heads which are mounted in diametrically opposite positions of a rotary cylinder.

Various auto tracking apparatus have recently been put to practical use in the field of video tape recorders in order that a magnetic head can accurately scan a video signal-recorded track on reproduction, particularly, speed-varying reproduction such as slow-motion reproduction.

One example of the conventional auto tracking apparatus is disclosed in U.S. Pat. No. 4,451,860 or Japanese Patent Provisional Publication No. 57-66526, the teachings of which involve sampling and holding the detection output of a reproduction high frequency signal at a given point in a field and controlling the head position to keep the level of the detection output to a maximum. However, such prior art apparatus would suffer the problem in that difficulty is encountered to ensure effective tracking control in cases where the following of the track is not parallel to the center line thereof, because the sampling of the detection output signal is performed in terms of only one point per each of a plurality of fields. Thus, a further improvement would be required from the viewpoint of increasing accuracy of the tracing by a reproducing head.

SUMMARY OF THE INVENTION

It is therefore an object of the present invention to provide a new and improved auto tracking apparatus which overcomes the above-described disadvantage inherent in the prior art apparatus.

More specifically, the present invention provides an auto tracking apparatus which makes it possible to accurately trace the whole of a track.

A feature of the present invention is to divide a tracing time period of one field of a frame into a plurality of time domains and to sample and hold the envelope detection output signal of the reproduced high frequency signal at every time domain. This sample-and-hold operation is successively made for the following frame and each of the sampled values is compared with the previously sampled value at the corresponding time domain. In accordance with the results of the comparison the displacement of a reproducing head is controlled at every sampling point so that the reproducing head can accurately scan the track along the center line thereof.

According to the present invention, there is provided an auto tracking apparatus comprising: a reproducing head disposed on the circumference of a rotary cylinder of the video tape recorder, the reproducing head being mounted on a head drive element and arranged to be movable in the direction normal to the plane of rotation of the rotary cylinder; a drive circuit for displacing the reproducing head by driving the head drive element; a circuit for performing envelope detection of a high frequency signal reproduced by the reproducing head; first sample-and-hold circuit means for sampling and holding the output signal of the envelope detection circuit in each of a plurality of time domains provided by dividing the duration of one field of a frame; second sample-and-hold circuit means for sampling and holding the output signal thereof in each of a plurality of time domains provided by dividing the duration of one field of the following frame; a plurality of comparison circuits for successively comparing the outputs of the first sample-and-hold circuit means with those of the second sample-and-hold circuit means; a plurality of control circuits for generating control signals for controlling the reproducing head in accordance with the results of the comparisons; and a circuit for alternately successively supplying the control signals to the head drive element.

In accordance with the present invention, there is further provided an auto tracking apparatus comprising: a reproducing head disposed on the circumference of a rotary cylinder of the video tape recorder, the reproducing head being mounted on a head drive element and arranged to be movable in the direction normal to the plane of rotation of the rotary cylinder; a drive circuit for displacing the reproducing head by driving the head drive element; a circuit for performing envelope detection of a high frequency signal reproduced by the reproducing head; a first group of three sample-and-hold circuits for sampling and holding the envelope detection output for a field of a frame at three timings; a second group of three sample-and-hold circuits for the envelope detection output for the corresponding field of the following frame at the same three timings; a first comparison circuit for comparing the sampled value obtained by the first sample-and-hold circuit of the first group of three sample-and-hold circuit with the sampled value obtained by the first sample-and-hold circuit of the second group of three sample-and-hold circuits; a second comparison circuit for comparing the sampled value obtained by the second sample-and-hold circuit of the first group of three sample-and-hold circuit with the sampled value obtained by the second sample-and-hold circuit of the second group of three sample-and-hold circuits; a third comparison circuit for comparing the sampled value obtained by the third sample-and-hold circuit of the first group of three sample-and-hold circuit with the sampled value obtained by the third sample-and-hold circuit of the second group of three sample-and-hold circuits; three control signal generating circuits respectively responsive to the outputs from the first, second and third comparison circuits, each of the three control signal generating circuits generating a control signal for increasing the output level of the drive circuit when the sampled value obtained by one of the first group of three sample-and-hold circuits is greater than the sampled value obtained by the corresponding one of the second group of three sample-and-hold circuits and generating a control signal for decreasing the output level of the drive circuit when the sampled value obtained by one of the first group thereof is smaller than the same obtained by the corresponding one of the second group thereof; and a control circuit responsive to the control signals from the three control signal generating circuits, for outputting a combined control signal for controlling the displacement of the reproducing head in relation to one field by successively switching the control signals at the three timings.

BRIEF DESCRIPTION OF THE DRAWINGS

The objects and features of the present invention will become more readily apparent from the following detailed description of the preferred embodiments taken in conjunction with the accompanying drawings in which:

FIGS. 2a–2c are timing charts useful for describing the embodiment of the present invention;

FIGS. 8a–8c are time charts useful for describing the relationship between the level of the sampled signal and the voltage applied to the head drive element;

DETAILED DESCRIPTION OF THE INVENTION

Prior to describing the embodiment of the present invention a brief description of the prior art apparatus will be first made with reference to FIGS. 3 through 10 for a better understanding of the present invention.

Figure 3:
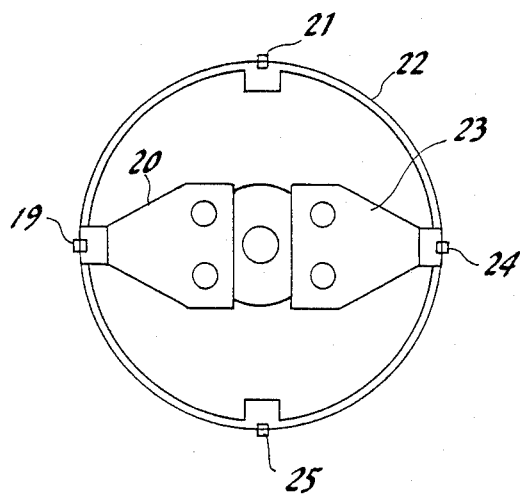
FIG. 3 is a schematic illustration of the structure of the upper cylinder of a rotary cylinder employed for an auto tracking apparatus according to the present invention.
Figure 4:
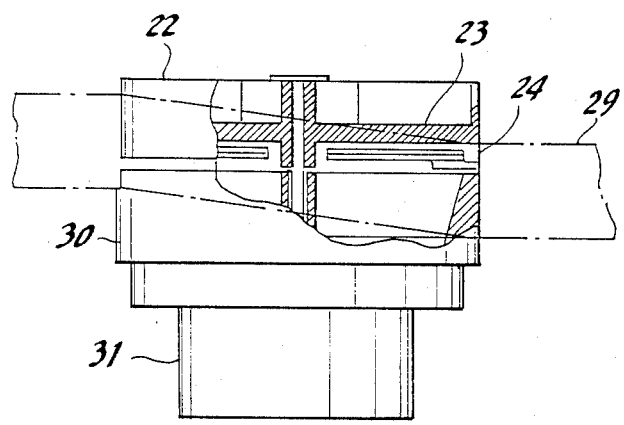
FIG. 4 is an illustration, partly broken away, of a rotary cylinder including the upper cylinder of FIG. 3.
Figure 5A:
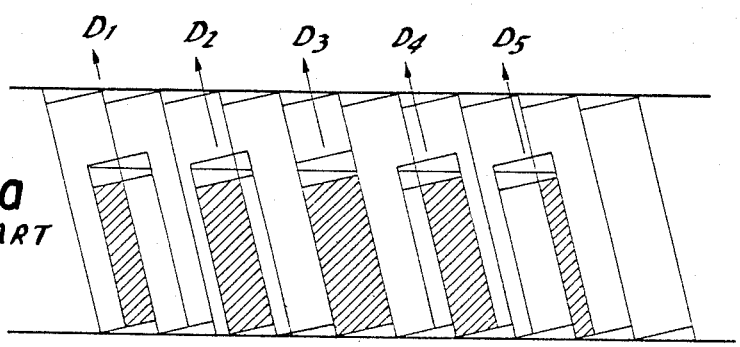
FIGS. 5a–5d are useful for describing the relationship between the traces of a reproduction head and the reproduction signals.
Figure 5B:
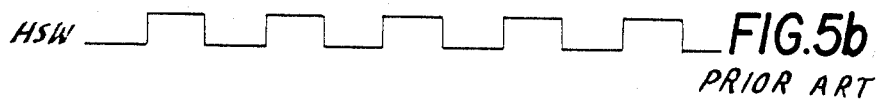
Figure 5C:
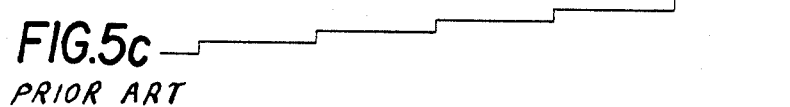
Figure 5D:
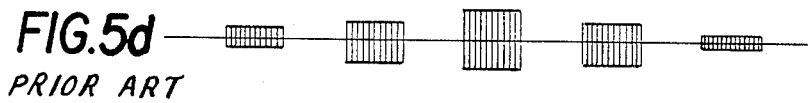

An upper cylinder 22 shown in FIG. 3 has a pair of reproducing heads 19 and 24 which are disposed in diametrically opposite positions of the circumference thereof and further has a pair of recording heads 21 and 25. The reproducing heads 19 and 24 are respectively mounted on first ends of head drive elements 20 and 23 such as piezoelectric elements, and opposite ends thereof are respectively fixedly secured on the upper cylinder 22, whereby the reproducing heads 19 and 24 are displaceable upon application of a voltage to the piezoelectric elements 20 and 23. The degree of the displacement depends upon the amplitude of the voltage applied thereto. The upper cylinder 22, as shown in FIG. 4, is disposed over a lower cylinder 30 to form a rotary cylinder and is arranged to be rotatable relative to the lower cylinder 30 by means of a drive motor 31. Such an arrangement enables the reproducing heads 19 and 24 to trace parallel tracks formed obliquely to the longitudinal direction of a tape 29 and allows the reproducing heads 19 and 24 to be movable in the direction normal to the longitudinal direction of the tracks.

Figure 6:
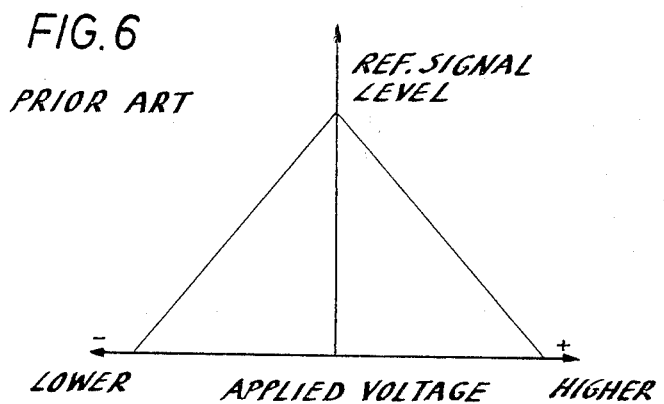
FIG. 6 is an illustration useful for describing the relationship between the voltage applied to a head drive element and the level of the reproduction signal.

FIGS. 5 and 6 are diagrams illustrating the relationship among a trace of a reproducing head, a voltage applied to a head drive element, and a reproduced high frequency signal (which will be hereinafter referred to as RF signal). In FIG. 5, the reference characters D1 through D5 represent the traces of a scan by a reproducing head and the character curve designated by HSW designates a head switching signal. It will be seen that the trace position relative to each of the tracks is varied in accordance with the variations of the amplitude of voltage applied to the head drive element and the level of RF signal is also varied in accordance with the variations thereof. When the voltage corresponding to the trace D3 is applied thereto, the track is accurately scanned by the reproducing head and therefore the RF signal has the highest level. Namely, the relation as shown in FIG. 6 is satisfied between the level of RF signal and the applied voltage. With this fact the auto tracking can be performed by displacing the reproducing head to keep the level of RF signal to a maximum.

Figure 7:
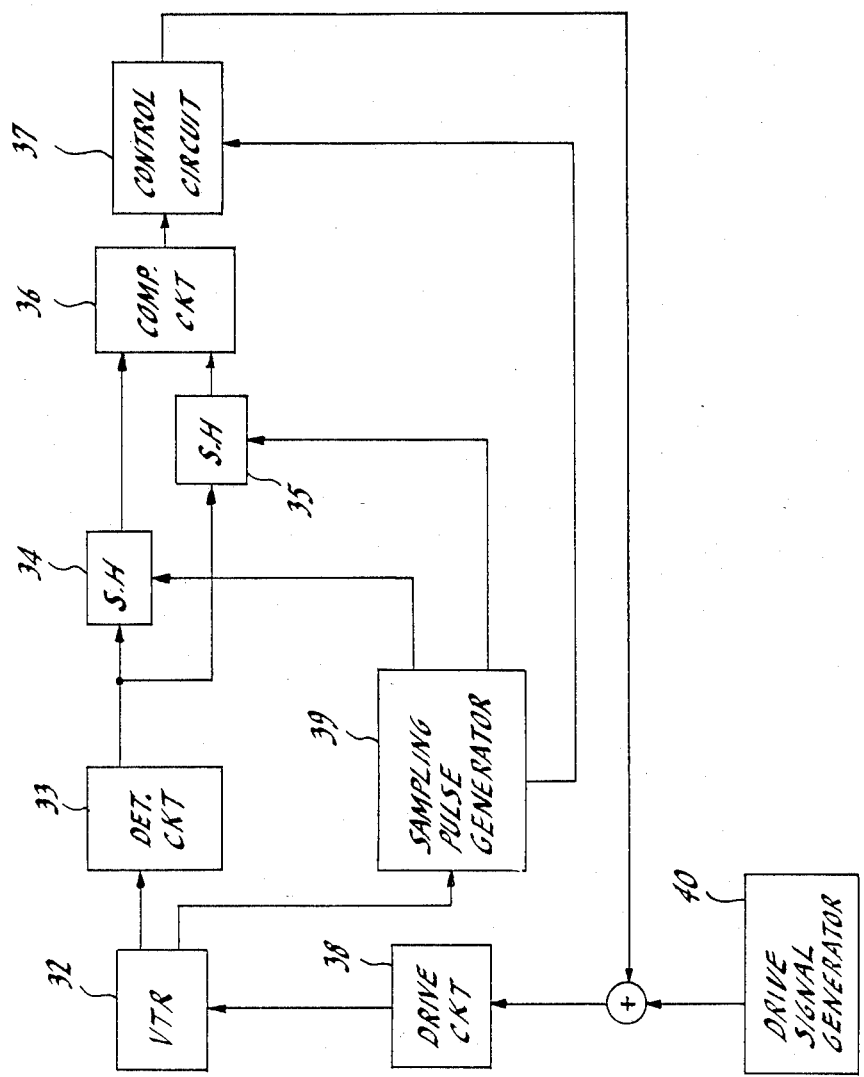
FIG. 7 is a block diagram showing the circuit arrangement of the conventional tracking apparatus.

FIG. 7 is an illustration of a circuit arrangement of the conventional auto tracking apparatus.

The conventional auto tracking apparatus of FIG. 7 is incorporated with a video tape recorder (VTR) 32 having a rotary cylinder as shown in FIGS. 3 and 4 wherein a reproducing head can be moved in the direction normal to the longitudinal direction of the track. A RF signal from the VTR 32 is supplied to a detection circuit 33 to perform the envelope detection. An envelope detection output of the detection circuit 33 is sampled and held by sample-and-hold circuits (S and H CKT) 34 and 35 in response to a sampling pulse generated by a sampling pulse generating circuit 39. For example, an envelope detection output in the odd field of a frame is sampled and held by the sample-and-hold circuit 34, and after an applied voltage to the head drive element is varied, an envelope detection output in the odd field of the next frame is sampled and held by the sample-and-hold circuit 35. Both sampled levels are compared by a comparison circuit 36. In accordance with the results of the comparison, a control circuit 37 controls voltage to be applied to the head drive element, i.e., the direction of displacement and the amount of displacement of the head. The output of the control circuit 37 is added to a head drive signal produced by a head drive signal generating circuit 40 on the basis of CTL signal, HSW signal and capstan FG signal from the VTR 32 and then supplied to a drive circuit 38 for amplification.

FIG. 8 is a timing chart illustrating the relationship between the level of the sampled output signal and the applied voltage. It will be understood from FIG. 8 that when the level is increased as compared with the level of the previous frame, the applied voltage is controlled to increase, and when the level is decreased, the applied voltage is decreased. That is, the applied voltage is controlled so that the level is kept to a maximum.

Figure 9:
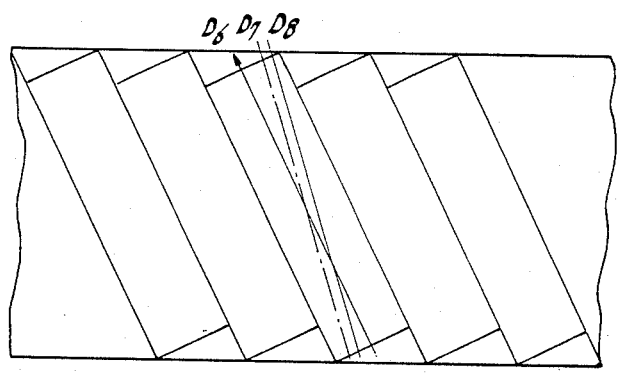
FIG. 9 is an illustration of traces of the reproducing head.
Figure 10:
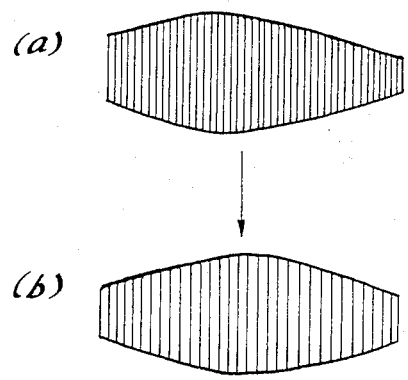
FIG. 10, consisting of parts a–b illustrates the reproducing signals corresponding to the traces of FIG. 9.

Although satisfactory for performing the tracking control in cases where the trace of a reproducing head is parallel to the center line of the track, it is difficult to effectively perform the auto tracking throughout, one field when the trace is not parallel as shown in FIG. 9. In FIG. 12, the character (a) represents the waveform of RF output signal obtained by trace D8 in FIG. 9. When the auto tracking is performed using the conventional auto tracking apparatus, the reproducing head traces the track as indicated by the character D7, and the trace indicated by D6 cannot be obtained. The character (b) of FIG. 10 designates the waveform of the RF output signal obtained by the trace D7.

Figure 1:
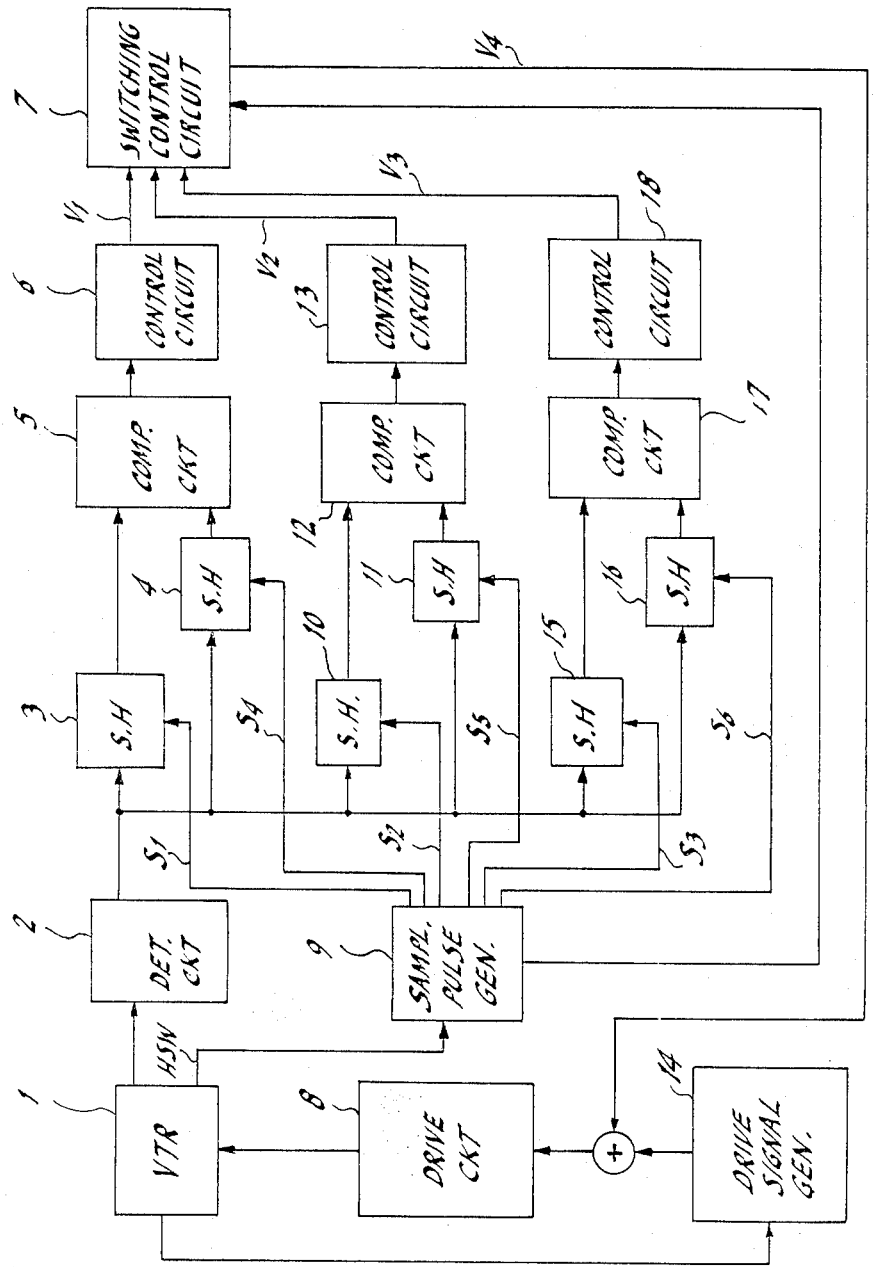
FIG. 1 is a block diagram showing a circuit arrangement according to the present invention.

Referring to FIG. 1, there is illustrated an auto tracking apparatus according to an embodiment of the present invention.

The embodiment shown in FIG. 1 is similar to the FIG. 7 prior art apparatus with the exception that it includes a plurality of pairs of sample-and-hold circuits, a plurality of comparison circuits, a plurality of control circuits, and a switching control circuit. In FIG. 1, a circuit arrangement for one reproducing head is illustrated for the purpose of simplicity of a description, and is illustrated as being provided with three pairs of sample-and-hold circuits whereby the sampling operation of the envelope detection signal is performed in each of three time domains per one field.

A RF signal from a VTR 1 is supplied to an envelope detection circuit 2 and a HSW signal therefrom supplied to a sampling pulse generating circuit 9. The envelope detection output is sampled and held by sample-and-hold circuits 3, 4, 10, 11, 15 and 16 in response to sampling pulse signals S1 through S6 from the sampling pulse generating circuit 9. More specifically, the envelope detection output for a field (for example odd field) of a frame is sampled at three sampling points by the sample-and-hold circuits 3, 10 and 15, while the envelope detection output for the field of the next frame is sampled at the same three points by the sample-and-hold circuits 4, 11 and 16. The sample-and-hold circuits 3, 4 are coupled to comparison circuit 5, the sample-and-hold circuits 10, 11 are coupled to comparison circuit 12, and the sample-and-hold circuits 15, 16 are coupled to comparison circuit 17. Therefore, for example, the sampled value held by the sample-and-hold circuit 3 is compared with that held by the sample-and-hold circuit 4 by means of the comparison circuit 5. The comparison circuits 5, 12 and 17 are respectively coupled to control circuits 6, 13 and 18 each being provided for controlling voltage to be applied to the head drive element and the amount of displacement of the head. Control signals V1 to V3 from the control circuits 6, 13 and 18 are supplied to a switching control circuit 7 in which each of the control signals is successively outputted at a point corresponding to each of the sampling points. The output signal from the switching control circuit 7 is added to a head drive signal produced by a head drive signal generating circuit 14 on the basis of CTL signal HSW signal and capstan FG signal from the VTR 1, and then supplied through a drive circuit 8 for amplification to the VTR 1 for controlling the voltage to be applied to the head drive element.

An auto tracking operation based on the foregoing arrangement shown in FIG. 1 will be better understood with reference to FIG. 2.

In FIG. 2, three sampling pulses S1, S2 and S3 are generated at an interval for the duration of one field of the first frame and the other three sampling pulses S4, S5 and S6 are also generated at the same interval for the duration of one field of the second frame. First, an envelope detection output for the field of the first frame is successively sampled at three sampling points in response to the sampling pulses S1, S2, S3, and then an envelope detection output for the same field of the second frame is similarly sampled in response to the sampling pulses S4, S5, S6. The levels of the outputs sampled in response to the pulses S1, S2, S3 are respectively compared with those of the outputs sampled in response to the pulses S4, S5, S6 by means of the comparison circuits 5, 12, 17. In accordance with the results of the comparisons, the control circuits 6, 13, 18 generate control signals V1, V2 and V3 for controlling the voltage to be applied to a reproducing head drive element. The applied voltage is independently controlled at every sampling point so that the amplitude thereof is increased when the level of a sampled output is greater than that of the previously sampled output and it is decreased when the level is smaller than the previous level. With this control the level of the envelope detection output is kept to a maximum. The control signals V1, V2, V3 from the control circuits 6, 13, 18 are successively outputted from the switching control circuit 7 at the timings corresponding to respective sampling points. That is, a control signal V4 is supplied from the switching control circuit 7 to the VTR 1.

It should be understood that the foregoing relates to only a preferred embodiment of the invention, and that it is intended to cover all changes and modifications of the example of the invention herein chosen for the purpose of the disclosure, which do not constitute departures from the spirit and scope of the invention.

What is claimed is:

1. An auto tracking apparatus for a video tape recorder, comprising:

a reproducing head disposed on the circumference of a rotary cylinder of said video tape recorder, said reproducing head being mounted on a head drive element and arranged to be movable in the direction normal to the plane of rotation of said rotary cylinder;

a drive circuit for displacing said reproducing head by driving said head drive element;

a circuit for performing envelope detection of a high frequency signal reproduced by said reproducing head and for producing an output;

a first group of three sample-and-hold circuits for sampling and holding the envelope detection output for a field of a frame at three times;

a second group of three sample-and-hold circuits for the envelope detection output for the corresponding field of the following frame at the same three times;

a first comparison circuit for comparing the sampled value obtained by the first sample-and-hold circuit of said first group of three sample-and-hold circuits with the sampled value obtained by the first sample-and-hold circuit of said second group of three sample-and-hold, said first comparison circuit producing an output circuits;

a second comparison circuit for comparing the sampled value obtained by the second sample-and-hold circuit of said first group of three sample-and-hold circuit with the sampled value obtained by the second sample-and-hold circuit of said second group of three sample-and-hold circuits, said second comparison circuit producing an output;

a third comparison circuit for comparing the sampled value obtained by the third sample-and-hold circuit of said first group of three sample-and-hold circuit with the sampled value obtained by the third sample-and-hold circuit of said second group of three sample-and-hold circuits, said third comparison circuit producing an output;

three control signal generating circuits respectively responsive to the outputs from said first, second and third comparison circuits, each of said three control signal generating circuits generating a control signal for increasing the output level of said drive circuit when the sampled value obtained by one of said first group of three sample-and-hold circuits is greater than the sampled value obtained by the corresponding one of said second group of three sample-and-hold circuits and generating a control signal for decreasing the output level of said drive circuit when the sampled value obtained by one of said first group thereof is smaller than the same obtained by the corresponding one of said second group thereof; and a control circuit responsive to the control signals from said three control signal generating circuits, for outputting to the drive circuit a combined control signal for controlling the displacement of said reproducing head in relation to one field by successively switching the control signals at the three times.

2. An autotracking apparatus for a video tape recorder as recited in claim 1, wherein said control circuit comprises means for alternately successively outputting said control signals, respectively generated by said three control signal generating circuits, to provide said combined control signal.

* * * * *